United States Patent
Lu et al.

(10) Patent No.: US 8,159,195 B2
(45) Date of Patent: Apr. 17, 2012

(54) OVERVOLTAGE PROTECTION CIRCUIT FOR USE IN CHARGER CIRCUIT SYSTEM AND CHARGE CIRCUIT WITH OVERVOLTAGE PROTECTION FUNCTION

(75) Inventors: Chien-Ping Lu, Tainan (TW); Nien-Hui Kung, HsinChu (TW); Li-Wei Lee, Jhubei (TW); Kwan-Jen Chu, HsinChu (TW); Ying-Hsin Hsing, Taipei (TW); Chun-Tsung Chen, Taipei (TW)

(73) Assignee: Richtek Technology Corporation, Hsin-Chu (TW)

( * ) Notice: Subject to any disclaimer, the term of this patent is extended or adjusted under 35 U.S.C. 154(b) by 531 days.

(21) Appl. No.: 12/381,272

(22) Filed: Mar. 10, 2009

(65) Prior Publication Data

US 2010/0066312 A1    Mar. 18, 2010

(30) Foreign Application Priority Data

Sep. 15, 2008   (TW) .............................. 97216630 U

(51) Int. Cl.
*H02J 7/10* (2006.01)
*H02J 7/00* (2006.01)
*H02J 7/04* (2006.01)
*H02H 3/00* (2006.01)

(52) U.S. Cl. ........ 320/163; 320/130; 320/131; 320/134; 320/162; 361/101; 363/50; 363/56.03; 363/56.06

(58) Field of Classification Search .................. 320/163, 320/130, 131, 134, 152, 157, 158, 159, 162, 320/164; 363/50, 56.03, 56.06; 361/101, 361/88, 90, 91.1, 91.2, 91.3, 91.4, 91.5, 91.6, 361/91.7, 91.8
See application file for complete search history.

(56) References Cited

U.S. PATENT DOCUMENTS

| | | | |
|---|---|---|---|
| 5,602,462 A * | 2/1997 | Stich et al. ..................... | 323/258 |
| 6,177,780 B1 * | 1/2001 | Roy et al. ....................... | 320/128 |
| 6,184,660 B1 * | 2/2001 | Hatular .......................... | 320/141 |
| 6,324,339 B1 * | 11/2001 | Hudson et al. ................ | 388/809 |
| 6,486,635 B1 * | 11/2002 | Matsuda et al. ............... | 320/134 |
| 2007/0229026 A1 * | 10/2007 | Morioka et al. ............... | 320/112 |
| 2008/0042617 A1 * | 2/2008 | Gamboa et al. ............... | 320/107 |

* cited by examiner

*Primary Examiner* — Patrick Assouad
*Assistant Examiner* — Steve T. Chung
(74) *Attorney, Agent, or Firm* — Tung & Associates

(57) ABSTRACT

The present invention discloses an overvoltage protection (OVP) circuit for use in a charger circuit system, comprising: a power transistor electrically connected between a voltage supply and a battery; an OVP circuit which turns off the transistor when a voltage supply exceeds a threshold value; and a multiplexing circuit electrically connected between an output of the OVP circuit and the gate of the transistor. The present invention also discloses a charger circuit with an OVP function, comprising: a single power transistor electrically connected between a voltage supply and a battery; an OVP control circuit which turns off the power transistor when a voltage supply exceeds a threshold value; and a charger control circuit which controls the gate of the power transistor to determine a charge current to the battery when the voltage supply does not reach the threshold value.

10 Claims, 2 Drawing Sheets

OVERVOLTAGE PROTECTION CIRCUIT FOR USE IN CHARGER CIRCUIT SYSTEM AND CHARGE CIRCUIT WITH OVERVOLTAGE PROTECTION FUNCTION

BACKGROUND OF THE INVENTION

1. Field of Invention

The present invention relates to an overvoltage protection (OVP) circuit for use in a charger circuit system and a charger circuit with OVP function.

2. Description of Related Art

Please refer to FIG. 1, which shows a prior art charger circuit. In this circuit, the OVP control circuit 11 detects whether the voltage supply VH exceeds a threshold value before charging the battery 14 (this battery for example is a battery in a portable electronic device); the OVP control circuit 11 turns on the transistor switch M1 only when the voltage supply VH is within a safety range, so that the battery can be safely charged. The OVP control circuit 11 and the transistor switch M1 can be taken combinationally as an OVP circuit (as shown in the dotted line). In charging process, the charger control circuit 12 controls the gate voltage of the transistor M2 to determine the amount of the charging current.

The prior art shown in FIG. 1 requires two power transistors M1 and M2. Accordingly, it has the following drawbacks: first, more cost; second, the two large transistors connected in series in the charging path cause higher resistance, thus reducing charger efficiency and causing more severe heat dissipation issue.

SUMMARY OF THE INVENTION

An objective of the present invention is to solve the problems of the prior art mentioned above; hence, the present invention provides an improved circuit structure. In one aspect, the present invention provides an OVP circuit for use in a charger circuit system; in another aspect, the present invention provides a charger circuit with OVP function.

The present invention provides an OVP circuit for use in charger circuit system, comprising: a power transistor electrically connected between a voltage supply and a battery; an OVP control circuit, which turns off the power transistor when the voltage supply exceeds a threshold value; and a multiplexing circuit electrically connected to an output of a gate of the power transistor.

In a preferred embodiment, the multiplexing circuit is further electrically connected to a charger control circuit, so that an output of the charger control circuit controls the gate of the power transistor in a period that the voltage supply does not exceed the threshold value. The multiplexing circuit can be a node or a more complicated form of multiplexing circuit.

On another perspective, the charger circuit with OVP function provided in the present invention comprises: a single power transistor electrically connected between a voltage supply and a battery, and no more power transistor is electrically connected therebetween; an OVP control circuit which turns off the power transistor when a voltage supply exceeds a threshold value; and a charger control circuit which controls the gate of the power transistor to determine a charge current to the battery when a voltage supply does not exceed the threshold value.

Preferably, an output of the OVP control circuit and an output of the charger control circuit can be electrically connected to a multiplexing circuit. An output of the multiplexing circuit controls a gate of the power transistor. The multiplexing circuit can be a node or a more complicated form of multiplexing circuit.

The objectives, technical details, features, and effects of the present invention will be better understood with regard to the detailed description of the embodiments below, with reference to the drawings.

DESCRIPTION OF THE PREFERRED EMBODIMENTS

Figure 1:
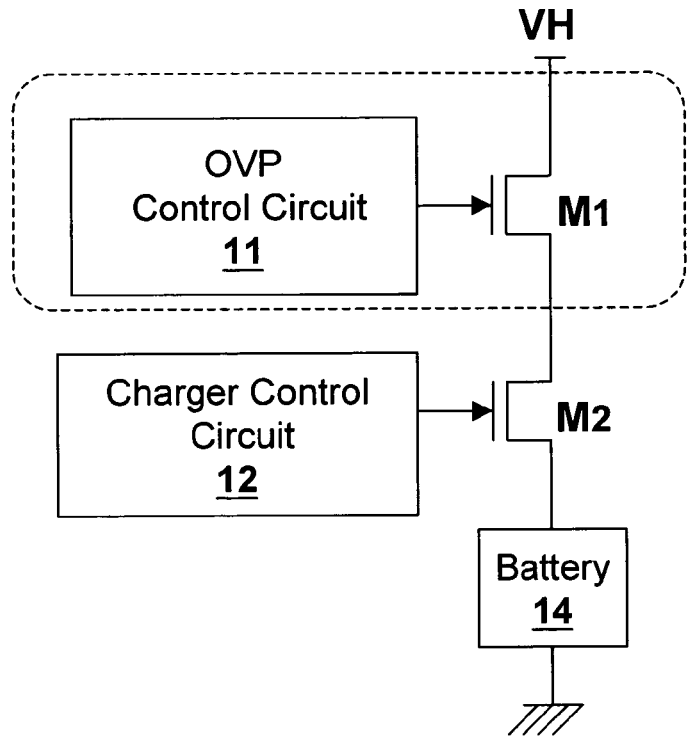
FIG. 1 is a schematic circuit diagram showing a prior art charger circuit.
Figure 2:
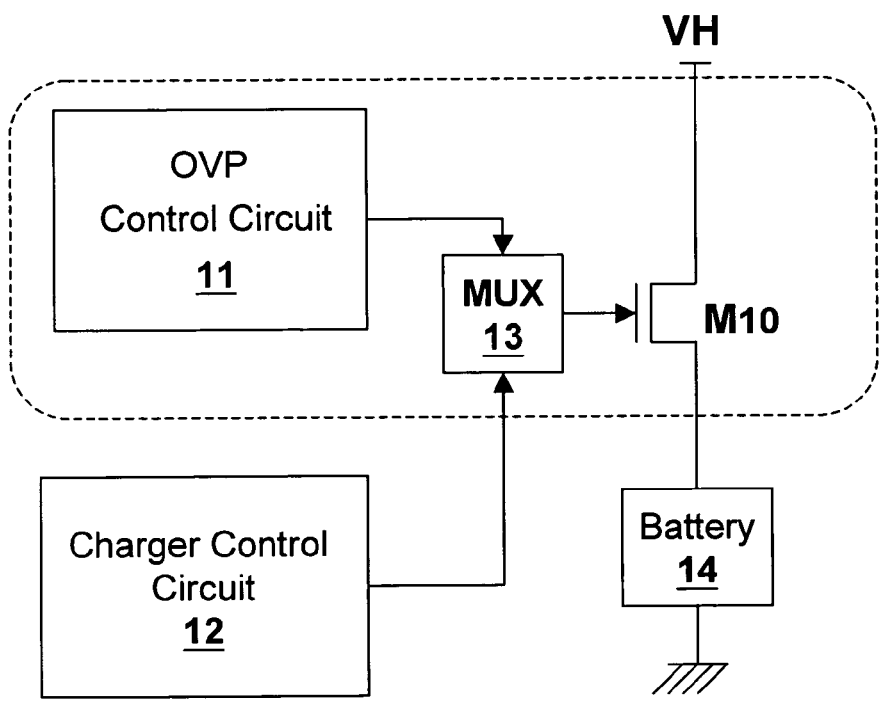
FIG. 2 is a schematic circuit diagram of an embodiment of the present invention, showing a charger circuit with OVP function, wherein it comprises an OVP circuit for use in a charger circuit system.

Referring to FIG. 2 for an embodiment of the present invention, in which only one transistor M10 is provided. The transistor M10 provides dual functions, operating both as an OVP switch while controlled by the OVP control circuit 11, and as a current controller while controlled by the charger control circuit 12. While it operates as an OVP switch, it has two statuses, on and off; while it operates to provide current control function, depending on the design of charger control circuit 12, the transistor M10 may have many analog statuses other than on and off, to control the amount of charge current to the battery 14.

The outputs of the OVP control circuit 11 and the charger control circuit 12 are electrically connected to a multiplexing circuit MUX 13. The multiplexing circuit MUX 13 selects between the output of the OVP control circuit 11 and the output of the charger control circuit 12, and controls the gate of the transistor M10 thereby. In other words, the output of the charger control circuit 12 controls the gate of the power transistor in a period wherein the gate of the transistor M10 is not controlled by the output of the OVP control circuit 11. The OVP control circuit 11, the multiplexing circuit MUX 13, and the transistor M10 constitute an OVP circuit (as shown in the dotted line). The multiplexing circuit MUX13 can be embodied in many forms. In the simplest form, the multiplexing circuit MUX13 can be only a node. In this case, assuming that the transistor M10 is an NMOS transistor, the OVP control circuit 11 should have current sinking capability. When it is required to proceed with overvoltage protection, the OVP control circuit 11 promptly discharges electrons in the gate of the transistor M10 to turn it off. If the transistor M10 is a PMOS transistor, the OVP control circuit 11 should be able to quickly raise up the gate voltage of the transistor M10 to turn it off when overvoltage protection is required.

Figure 3:
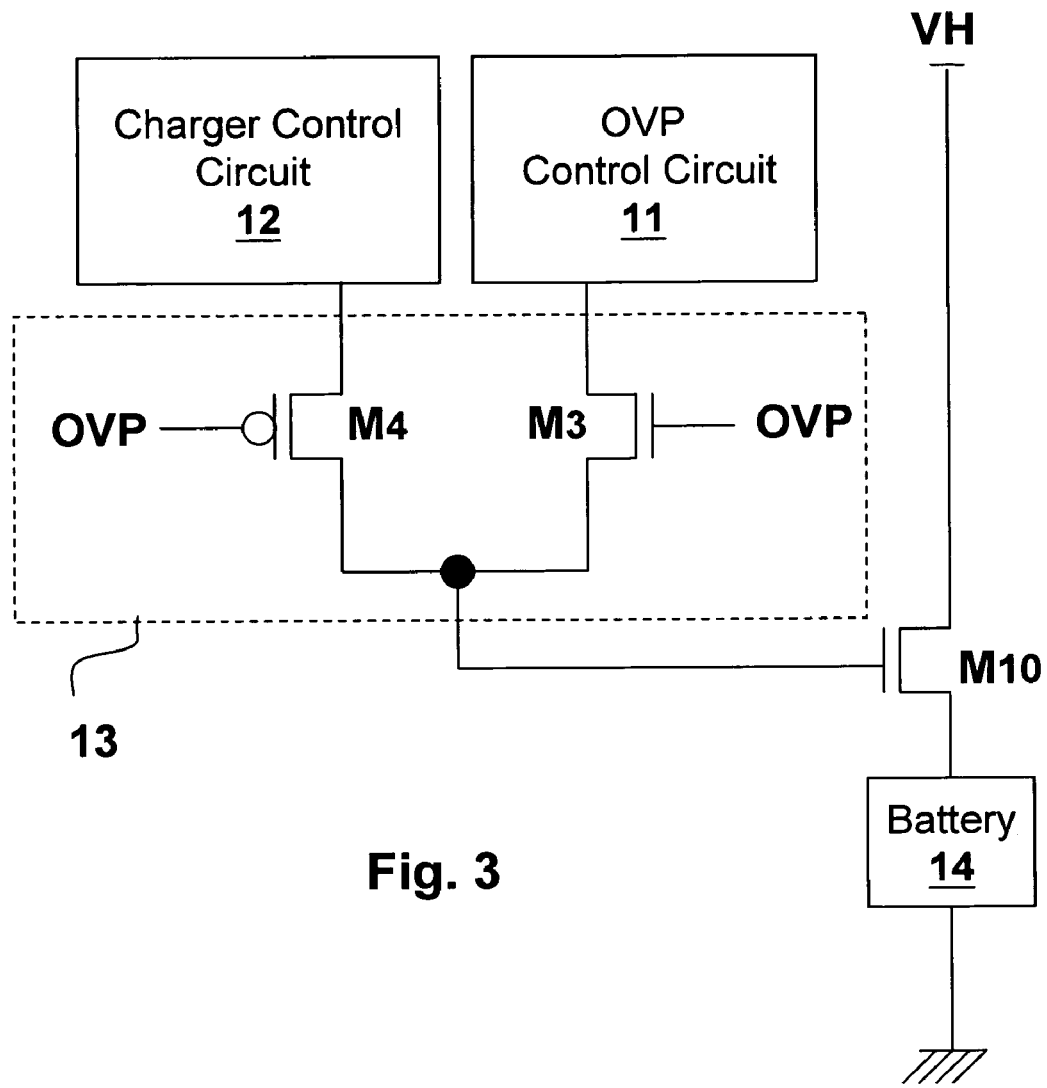
FIG. 3 shows one embodiment of a multiplexing circuit MUX 13.
Figure 4:
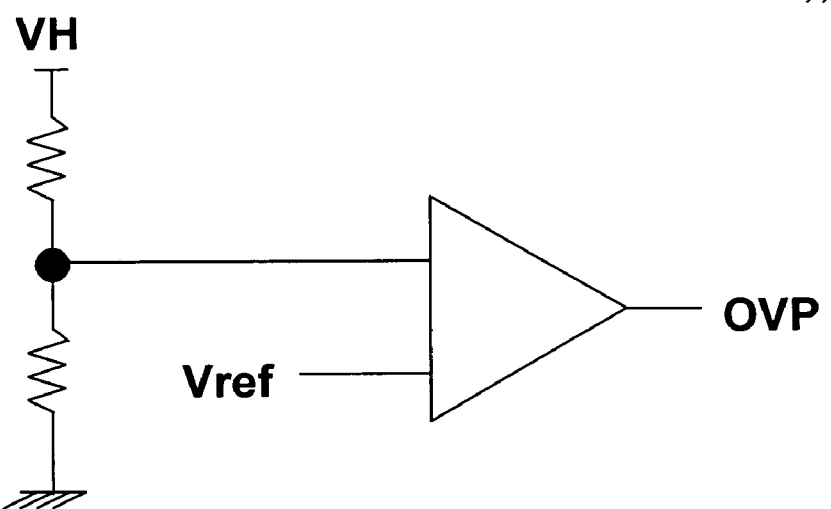
FIG. 4 shows one embodiment for generating an OVP signal.

FIG. 3 shows another form of the multiplexing circuit MUX 13. The circuit generates an overvoltage signal OVP when overvoltage protection is necessary. (This OVP signal can be generated by the OVP control circuit 11 or by other circuits, such as by comparing a dividend voltage of the voltage supply VH with a reference voltage, as referring to FIG. 4.) The OVP signal turns on the transistor M3 and turns off the M4, so that the gate of the transistor M10 is controlled by the OVP control circuit 11.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the transistor of the present invention is not limited to any particular transistors; the multiplexing circuit MUX 13 of the present invention can be embodied in other forms than the two embodiments mentioned above. In view of the foregoing, the spirit of the present invention should cover all such and other modifications and variations, which should be interpreted to fall within the scope of the following claims and their equivalents.

What is claimed is:

1. An overvoltage protection (OVP) circuit for use in a charger circuit system, comprising:
    a power transistor electrically connected between a voltage supply and a battery;
    an OVP control circuit, which turns off the power transistor when the voltage supply exceeds a threshold value; and
    a multiplexing circuit electrically connected between an output of the OVP control circuit and a gate of the power transistor.

2. The OVP circuit of claim 1, wherein the multiplexing circuit is further electrically connected to a charger control circuit so that an output of the charger control circuit controls the gate of the power transistor in a period.

3. The OVP circuit of claim 2, wherein the multiplexing circuit is a node.

4. The OVP circuit of claim 2, wherein the multiplexing circuit determines whether an output of the OVP control circuit or an output of the charger control circuit is provided to the gate of the power transistor according to an overvoltage signal.

5. The OVP circuit of claim 2, wherein the charger control circuit controls the gate of the power transistor to determine a charge current to the battery.

6. A charger circuit with overvoltage protection (OVP) function, comprising:
    a single power transistor electrically connected between a voltage supply and a battery, and no more power transistor is electrically connected therebetween;
    an OVP control circuit which turns off the power transistor when a voltage supply exceeds a threshold value; and
    a charger control circuit which controls a gate of the power transistor to determine a charge current to the battery when a voltage supply does not exceed the threshold value; and a multiplexing circuit electrically connected between an output of the OVP control circuit and a gate of the power transistor.

7. The charger circuit of claim 6, wherein an output of the OVP control circuit and an output of the charger control circuit are electrically connected to a multiplexing circuit, whose output controls the gate of the power transistor.

8. The charger circuit of claim 7, wherein the multiplexing circuit is a node.

9. The charger circuit of claim 7, wherein the multiplexing circuit determines whether an output of the OVP control circuit or an output of the charger control circuit is provided to the gate of the power transistor according to an overvoltage signal.

10. The charger circuit of claim 9, wherein the overvoltage signal is generated by comparing a dividend voltage of the voltage supply with a reference voltage.

\* \* \* \* \*